United States Patent
Davis et al.

(10) Patent No.: US 9,652,196 B2
(45) Date of Patent: May 16, 2017

(54) SMART AUDIO ROUTING MANAGEMENT (71) Applicant: Microsoft Technology Licensing, LLC, Redmond, WA (US)

(72) Inventors: Darren Ray Davis, Woodinville, WA (US); Vincent Bellet, Redmond, WA (US); William Scott Stauber, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/754,500

(22) Filed: Jun. 29, 2015

(65) Prior Publication Data

US 2016/0378426 A1 Dec. 29, 2016

(51) Int. Cl.
*H04B 3/00* (2006.01)
*G06F 3/16* (2006.01)

(52) U.S. Cl.
CPC .............. *G06F 3/165* (2013.01); *G06F 3/167* (2013.01)

(58) Field of Classification Search
CPC .... H04R 3/12; H04R 2420/07; H04R 1/1041; H04R 3/00; H04R 17/00; H04R 17/02; H04R 1/028; H04R 1/04; H04R 1/1083; H04R 1/2807; H04R 1/34; H04R 1/406; H04R 2205/041; H04R 2225/51; H04R 2225/55; H04R 2227/003; H04R 2460/03
USPC ...... 381/334, 107, 120, 123, 150, 23.1, 303, 381/74, 77, 91
See application file for complete search history.

(56) References Cited

U.S. PATENT DOCUMENTS

| | | | |
|---|---|---|---|
| 8,068,925 B2 | 11/2011 | McKillop et al. | |
| 8,095,694 B2* | 1/2012 | Rostaing | G06F 3/165 700/94 |
| 8,706,162 B1 | 4/2014 | Abrahamsson et al. | |
| 8,711,866 B2 | 4/2014 | Shmueli et al. | |
| 8,843,178 B1 | 9/2014 | Wong | |
| 2007/0124068 A1* | 5/2007 | Nakayama | G01C 21/3655 701/414 |
| 2008/0146206 A1* | 6/2008 | Pichardo | H04M 1/57 455/415 |
| 2008/0186960 A1 | 8/2008 | Kocheisen et al. | |
| 2009/0006671 A1 | 1/2009 | Batson et al. | |
| 2010/0060572 A1 | 3/2010 | Tsern | |
| 2011/0182441 A1 | 7/2011 | Coffman et al. | |

(Continued)

OTHER PUBLICATIONS

"Audio Session Programming Guide", Published on: Sep. 17, 2014 Available at: https://developer.apple.com/library/ios/documentation/Audio/Conceptual/AudioSessionProgrammingGuide/AudioSessionProgrammingGuide.pdf.

(Continued)

*Primary Examiner* — Akelaw Teshale (57) ABSTRACT

Examples described herein automatically route audio signals associated with applications to appropriate audio endpoints when a computing device is operating in a disjoint mode. Smart audio routing management of audio signals is based on content output destinations for applications associated with the audio signals. Smart audio routing management enables computing devices operating in a disjoint mode to receive audio signals relevant to application content rendered or displayed over multiple devices, and correctly route individual audio signals to audio endpoints that correspond to a location where associated application content is displayed.

20 Claims, 7 Drawing Sheets

(56) References Cited

U.S. PATENT DOCUMENTS

| | | | |
|---|---|---|---|
| 2011/0213901 A1* | 9/2011 | Rostaing | G06F 3/165 710/19 |
| 2013/0332837 A1 | 12/2013 | Jarvinen et al. | |
| 2014/0120829 A1* | 5/2014 | Bhamidipati | H04N 21/42207 455/3.06 |
| 2014/0173467 A1* | 6/2014 | Clavel | H04L 12/1822 715/758 |
| 2014/0277646 A1* | 9/2014 | Anderson | G06F 3/165 700/94 |
| 2014/0282746 A1 | 9/2014 | Lin et al. | |
| 2015/0117666 A1 | 4/2015 | Dantrey | |
| 2016/0242148 A1* | 8/2016 | Reed | H04L 45/66 |

OTHER PUBLICATIONS

"Netgear", Retrieved on: May 14, 2015 Available at: http://www.netgear.com/home/products/connected-entertainment/wireless-display-adapters/PTV3000.aspx.

Wang, Songyue, "How to Enable Intel® Wireless Display Differentiation for Miracast* on Intel® Architecture phone", Published on: Sep. 6, 2013 Available at: https://software.intel.com/en-us/articles/how-to-enable-intel-wireless-display-differentiation-for-miracast-on-intel-architecture.

Greenlee, Michael, "Reproducing Complex PBX Features Using Lync 2010 Custom Audio Routing", Published on: Oct. 2011 Available at: https://msdn.microsoft.com/en-us/library/office/hh527751(v=office.14).aspx.

"Audio Routing—Media Playback", Published on: Jan. 28, 2015 Available at: https://dev.windowsphone.com/en-US/OEM/docs/Driver_Components/Audio_routing_-_Media_playback.

"Route 6000—Audio Routing System—SW v2.1", Published on: Sep. 2009 Available at: http://www.avc.hr/salesprogrann/files/db_files/files/studer-br-route6000.pdf.

"Android MiniPCs and TVBoxes", Published on: Jul. 8, 2013 Available at: http://android-minipc.azurewebsites.net/index.php/tag/miracast/.

"International Search Report and Written Opinion Issued in PCT Application No. PCT/US2016/039145", Mailed Date: Sep. 23, 2016, 12 Pages.

* cited by examiner

| APPLICATION | ACESSORY CONNECTED | STATE DATA | ROUTE SOUND |
|---|---|---|---|
| TELEPHONE | AUXILIARY | BACKGROUND | PHONE SPEAKER |
| TEXT MESSAGING | AUXILIARY | BACKGROUND | PHONE SPEAKER |
| MEDIA | AUXILIARY | BACKGROUND – LINKED TO PRESENTATION | AUXILIARY SPEAKER |
| CALENDAR | AUXILIARY | BACKGROUND | PHONE SPEAKER |
| PRESENATION | AUXILIARY | FOREGROUND AUXILIARY & CORE | AUXILIARY SPEAKER |
| DOCUMENT EDITING | AUXILIARY | BACKGROUND | PHONE SPEAKER |
| NAVIGATION | AUXILIARY | BACKGROUND | PHONE SPEAKER |
| GAME | AUXILIARY | BACKGROUND | PHONE SPEAKER |
| VOICEMAIL | AUXILIARY | BACKGROUND | PHONE SPEAKER |
|  |  |  |  |

FIG. 6a

| APPLICATION | ACESSORY CONNECTED | STATE DATA | ROUTE SOUND |
|---|---|---|---|
| TELEPHONE | AUXILIARY | BACKGROUND | PHONE SPEAKER |
| TEXT MESSAGING | AUXILIARY | BACKGROUND | PHONE SPEAKER |
| MEDIA | AUXILIARY | FOREGROUND AUXILIARY FULL-SCREEN | AUXILIARY SPEAKER |
| CALENDAR | AUXILIARY | BACKGROUND | PHONE SPEAKER |
| PRESENATION | AUXILIARY | BACKGROUND | PHONE SPEAKER |
| DOCUMENT EDITING | AUXILIARY | BACKGROUND | PHONE SPEAKER |
| NAVIGATION | AUXILIARY | BACKGROUND | PHONE SPEAKER |
| GAME | AUXILIARY | FOREGROUND CORE | PHONE SPEAKER |
| VOICEMAIL | AUXILIARY | BACKGROUND | PHONE SPEAKER |
|  |  |  |  |

SMART AUDIO ROUTING MANAGEMENT

BACKGROUND

Many applications executing on a computing device have multimedia content which includes audio content. When audio content signals from these application are processed they are typically routed to a default audio endpoint on the computing device, such as a loudspeaker. There is generally one default audio endpoint for the computing device, and audio signals from various applications are routed to this one endpoint for output.

SUMMARY

Examples of the disclosure provide a computing device configured to stream content to an auxiliary device. An audio routing component coupled to or in communication with the computing device receives a plurality of audio signals associated with a plurality of applications implemented on the computing device and obtains state data for the applications. The audio routing component determines a content output destination associated with the individual application, the content output destination corresponding to at least one of the computing device or the auxiliary device. The audio routing component identifies an audio endpoint associated with the content output destination for the individual application and routes an individual audio signal associated with the individual application to the identified audio endpoint.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure provide for intelligent audio routing management of audio signals to appropriate audio endpoints based on content output locations for applications associated with the audio signals. In some examples, this audio routing management enables computing devices operating in a disjoint mode to receive audio signals relevant to application content rendered or displayed over multiple devices and automatically route individual audio signals to audio endpoints where associated application content is being displayed or viewed. As described herein, disjoint mode refers to a computing device communicatively coupled to an another device, for the purpose of the computing device sending content to at least two displays at the same time, in which the content on each display is different. As described herein, each display in a disjoint mode experience may show different content, as opposed to a duplicate or mirrored mode where each display shows the same content. In these examples, a computing device in disjoint mode may stream or project content to one display that may appear to be separate or independent of content output on another display of a similarly connected device. Peripheral devices connected to the computing device, such as keyboard and mice, may also behave differently in a disjoint experience, providing a user experience in which it appears that each connected output device is operating in a quasi-independent fashion. Other connected devices may enable input directly associated with content displayed on that device to be routed back and managed by the computing device rendering the displayed content. In these examples, such a disjoint mode extends the user's experience to create an environment in which the computing device is behaving as if it is two independent devices. In some examples, disjoint mode may occur based on a user command, a proximity distance between the computing device and an auxiliary device, a location trigger, or any other suitable trigger event.

The computing device may be referred to as a core computing device, a local computing device, or a primary computing device, in some examples. The connected device may be another computing device in some illustrative examples, and in other examples the connected device may be a device with less resources than the computing device, such as a monitor or display device. The connected device may also be referred to as a secondary device, auxiliary device, or a remote device, in some examples.

Some examples provide a view-based model that enables an audio system to route audio to the appropriate endpoint based on the viewing location of an application associated with a received audio signal. Aspects of the disclosure further enable an application that has two different views, one on each screen, to have audio streams routed for playback out of the appropriate audio endpoint for the associated view.

Figure 1:
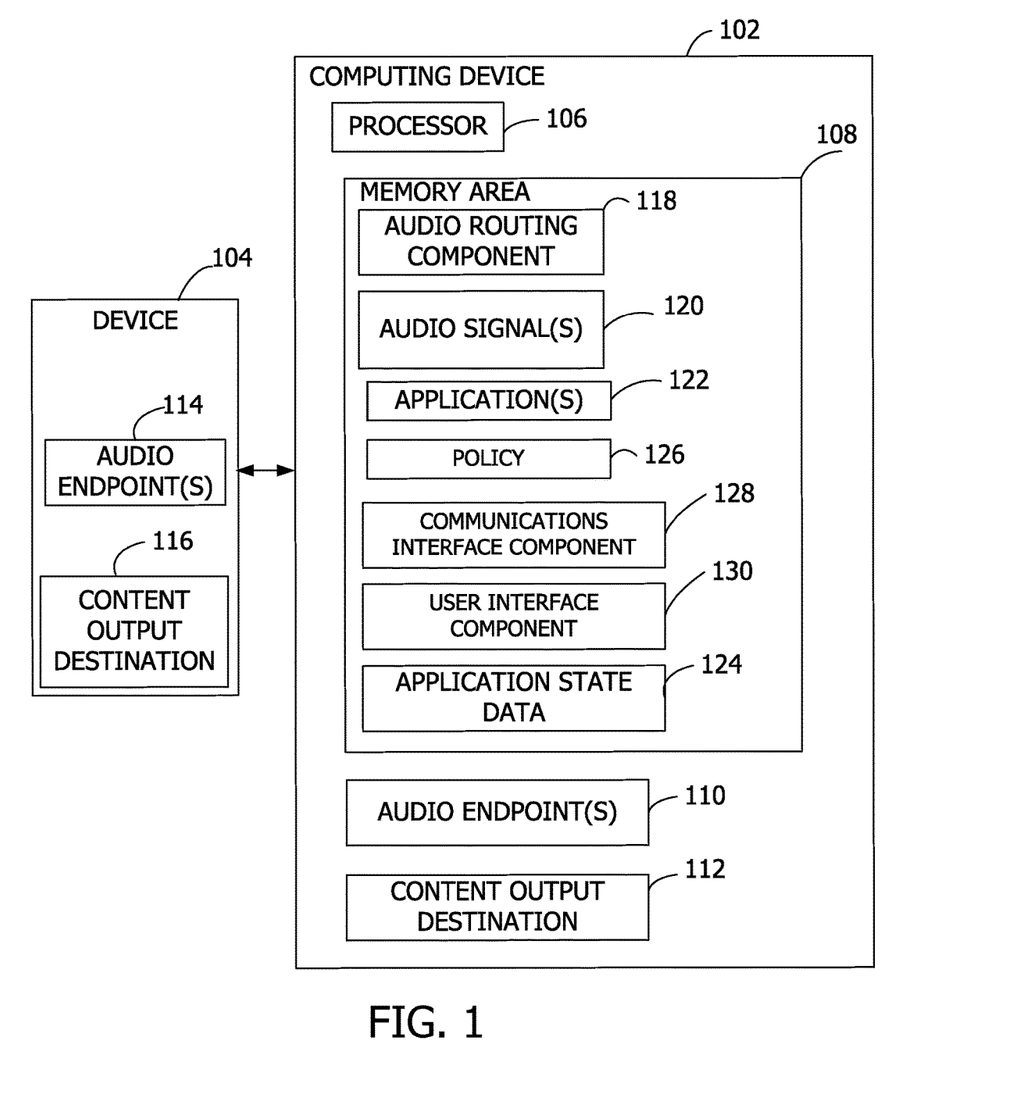
FIG. 1 is an exemplary block diagram illustrating a computing device for smart audio routing management.

Referring now to FIG. 1, an exemplary block diagram illustrates a computing device for smart audio routing management. In the example of FIG. 1, the computing device represents a system for routing audio signals associated with applications to audio endpoints corresponding to content output locations for those applications. The computing device represents any device executing instructions (e.g., as application programs, operating system functionality, or both) to implement the operations and functionality associated with the computing device. The computing device may include a mobile computing device or any other portable device. In some examples, the mobile computing device includes a mobile telephone, laptop, tablet, computing pad, netbook, gaming device, wearable device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device has at least one processor, a memory area, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 4-5).

In some examples, the processor represents an implementation of analog techniques to perform the operations described herein. For example, the operations may be performed by an analog computing device and/or a digital computing device.

Figure 2:
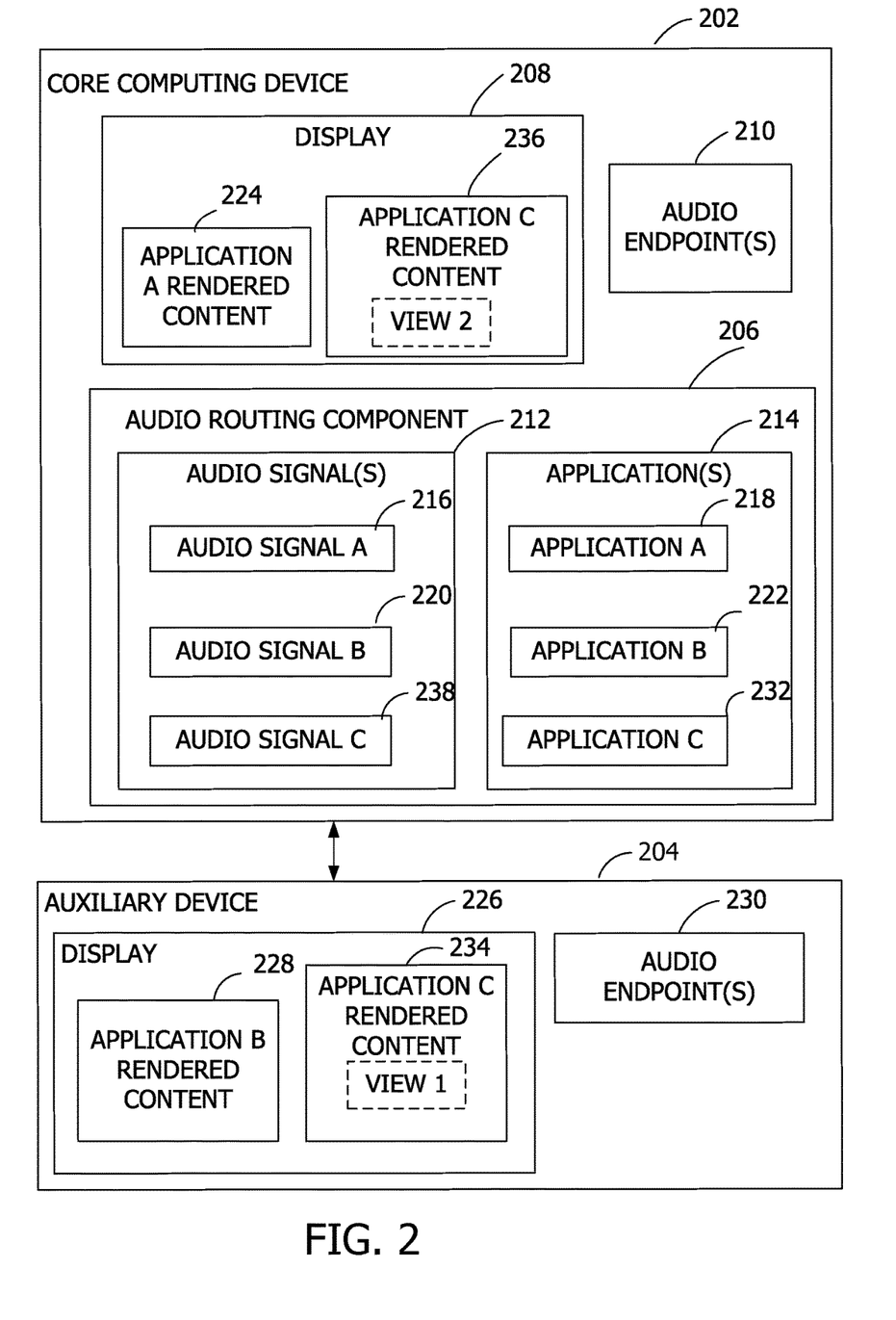
FIG. 2 is an exemplary block diagram illustrating a core computing device and an auxiliary computing device in disjoint mode.

The computing device further has one or more computer readable media such as the memory area. The memory area includes any quantity of media associated with or accessible by the computing device. The memory area may be internal to the computing device (as shown in FIG. 1-2), external to the computing device (not shown), or both (not shown). In some examples, the memory area includes read-only memory and/or memory wired into an analog computing device.

The memory area stores, among other data, one or more applications. The applications, when executed by the processor, operate to perform functionality on the computing device. Exemplary applications include mail application programs, web browsers, calendar application programs, address book application programs, messaging programs, communication applications, media applications, location-based services, search programs, productivity applications, and the like. The applications may communicate with counterpart applications or services such as web services accessible via a network. For example, the applications may represent downloaded client-side applications that correspond to server-side services executing in a cloud.

The memory area further stores one or more computer-executable components. Exemplary components include an audio routing component, communications interface component, and a user interface component. The user interface component, when executed by the processor of the computing device, causes the processor to output data to the user interface component and process user input received via the user interface component.

In some examples, the communications interface component includes a network interface card and/or computer-executable instructions (e.g., a driver) for operating the network interface card. Communication between the computing device and other devices may occur using any protocol or mechanism over any wired or wireless connection. In some examples, the communications interface is operable with short range communication technologies such as by using near-field communication (NFC) tags.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

Referring again to FIG. 1, an exemplary block diagram illustrates a computing device for smart audio routing management. Computing device 102 may be communicatively coupled to or in communication with device 104. Device 104 may be any suitable device capable of receiving content or data from computing device 102 for display or output. In these examples, device 104 may include, without limitation, an auxiliary computing device, a display device, a speaker device, an embedded device, or any other suitable device capable of communicating with computing device 102.

Computing device 102 includes processor 106, which may be communicatively coupled to memory area 108. Computing device 102 may also include audio endpoint(s) 110 and content output destination 112. Audio endpoint(s) 110 may be any type of speaker or audio output device coupled to computing device 102. Exemplary audio endpoints may include, without limitation, loudspeakers, headphones, earphones, earbuds, headsets, or any other suitable audio output device. Audio endpoint(s) 110 may be wireless or wired audio speakers configured to receive and output audio signals. Content output destination 112 may be any type of output device that presents content for user consumption or interaction. For example, exemplary content output destinations may include, without limitation, a display device, a display element of a graphical user interface, an audio output device, a haptic output device, or any other suitable device configured for content output.

Device 104 may also include audio endpoint(s) 114 and content output destination 116, which may be similar to audio endpoint(s) 110 and content output destination 112, in these examples.

Memory area 108 may include audio routing component 118, audio signal(s) 120, application(s) 122, policy 124, user preference data 126, communications interface component 128 and user interface component 130. Audio routing component 118 receives audio signal(s) 120 associated with application(s) 122 and routes audio signal(s) 120 to the appropriate audio endpoints depending upon where content from the associated applications is being output or viewed, for example. In these examples, computing device 102 provides the application-rendered content, which may be displayed or viewed on either computing device 102, device 104, or both computing device 102 and device 104. In one example, application-rendered content for one application may be displayed or viewed on computing device 102 concurrently with application-rendered content for another application being displayed or viewed on device 104. As another example, an application may have two views, with one view displayed on computing device 102 and another view displayed on device 104.

Audio routing component 118 provides smart audio routing management by identifying the state of the application associated with the received audio signal as well as the current content output destination for the associated application when determining where to route the received audio signal, specifically to which audio endpoint, if any. In previous audio routing scenarios, there is generally only one default audio endpoint, and all audio is routed to the default audio endpoint regardless of which devices are connected or where content is currently being output or viewed. In these prior examples, if a mobile device is connected to a pair of earbuds, for example, the earbud connection is designated as the default audio endpoint for all audio signals received at the mobile device. Likewise, in other previous examples, if a computing device is connected to a second screen, a speaker associated with the second screen may become the default audio endpoint for all audio signals received at the computing device.

Audio routing component 118 receives audio signal(s) 120 associated with application(s) 122 and identifies or obtains application state data 124 for application(s) 122. Application state data 124 may include information such as, without limitation, whether the application(s) are running in the background or foreground, whether applications running in the foreground are active or non-active, whether applications running in the foreground are in full-screen mode or partial-screen mode, whether applications are operating in shared mode or exclusive mode, whether applications running the foreground have multiple views, whether applications with multiple views are displaying views over multiple devices, and the like. In these examples, a foreground application may be active or non-active. An active application refers to an application that has a user's focus or has the latest user interaction, and a non-active application refers to an application that is in the foreground but does not have the user's focus or the latest user interaction in time. In these examples, full-screen mode refers to an application mode that consumes all available pixels of a display for application-rendered content, while partial-screen mode refers to an application mode that consumes less than all available pixels of a display for application-rendered content. In these examples, exclusive mode refers to a mode where an application has exclusive use of the audio endpoint device that outputs the audio stream, while shared mode refers to a mode where multiple applications may share an audio endpoint device, for example by opening shared-mode audio streams on the device. In addition to identifying state data for application(s) 122, audio routing component 118 identifies a current content output destination for each application with a received audio signal. An individual application may have more than one content output destination, such as in the example of an application with multiple views, where one view is output to a destination on a core computing device while another view is output to a destination on an auxiliary device.

In some examples, a media streaming application executing on a mobile device may be outputting content to a second screen, when an incoming call is received and displayed on the mobile device display. In this example, audio routing component 118 may receive audio signals for both the media streaming application and the telephone application, identify that both applications are in the foreground, and identify that the media streaming application content is being viewed on the second screen in full-screen mode while the telephone application content is being displayed on the mobile device screen. In this example, audio routing component 118 may direct the audio signal associated with the media streaming application to an audio endpoint associated with the second screen where the media content is being displayed or viewed while directing the audio signal associated with the telephone application to an audio endpoint associated with the mobile device, allowing the movie audio to continue output from the loudspeaker of the second screen while the telephone audio is routed to output from an internal speaker of the mobile device.

Policy 126 may include any number of heuristics, models, and/or algorithms for determining an appropriate audio endpoint based in part on state data for an application, current application conditions, current content output destinations for an application, user preference data, operating system policies, application policies, application performance-based policies, and/or any other suitable rule. As one exemplary illustration, policy 126 may include rules for audio routing management based on whether or not an application is in full-screen mode, or based on whether or not user interface component 130 is currently displayed on content output destination 116 of device 104, for example. Audio routing component 118 may use policy 126 when determining an appropriate audio endpoint for routing a received audio signal. User preference data may be obtained via user input or learned over time via machine learning based on user interaction with computing device 102, for example. User preference data may include, for example, user preferred default audio endpoints for specific applications, types of use, types of audio signals, times of day, privacy settings, and/or any other audio routing preference.

Communications interface component 128 may be used to establish or maintain, or both establish and maintain, a connection between computing device 102 and device 104, in these examples. In some illustrative examples, computing device 102 may obtain information about device 104, such as whether or not device 104 is audio capable, data about available audio endpoint(s) 114, data about content output destination 116, or any other suitable device data, during the connection facilitated by communication interface component 128. The operating system of computing device 102 maintains a list of all audio endpoints based on connection type and determines which endpoint should be used as the default endpoint, for example. In some examples, audio endpoint connection types may include, without limitation, audio jack connections, universal serial bus (USB) connections, Bluetooth® connections, or any other suitable communication connection.

The components illustrated in FIG. 1 are exemplary and not intended to provide limitations on the scope or capabilities of audio routing component 118. In some examples, user interface component 130 may project or stream a user interface of computing device 102 to a display of device 104. User interface component 130 may determine what content to display, and where, based on a state of an application determined using application state data 124, for example. Application(s) 122 may also choose to override a default audio endpoint selection as indicated by the operating system and define a different default audio endpoint to use, based on an application policy or type of audio being output, in some examples.

Referring next to FIG. 2, an exemplary block diagram illustrates a core computing device and an auxiliary computing device in disjoint mode. Core computing device 202 may be any device executing instructions (e.g., as application programs, operating system functionality, or both) to implement the operations and functionality associated with the computing device. In these examples, core computing device 202 may include, without limitation, a mobile computing device or any other portable device, a less portable device, or a group of processing units or other computing devices. In some examples, a mobile computing device may include a mobile telephone, laptop, tablet, computing pad, netbook, gaming device, wearable computing device, and/or portable media player. A less portable devices may include desktop personal computers, kiosks, tabletop devices, industrial control devices, wireless charging stations, and electric automobile charging stations, in these examples.

Core computing device 202 may be communicatively coupled to or in communication with auxiliary device 204. Auxiliary device 204 may be any suitable device capable of receiving content or data from core computing device 202 for display or output. In these examples, auxiliary device 204 may include, without limitation, an auxiliary computing device, a display device, a speaker device, an embedded device, or any other suitable device capable of communicating with core computing device 202.

In this exemplary diagram, core computing device 202 includes audio routing component 206, display 208, and audio endpoint(s) 210. Audio routing component 206 may be an illustrative example of one implementation of audio routing component 118 in FIG. 1, for example. Audio routing component 206 receives audio signal(s) 212 associated with application(s) 214. In this illustrative example, audio signal(s) 212 may include audio signal-A 216, which is associated with application-A 218, and audio signal-B 222, which is associated with application-B 222. Audio routing component 206 may identify or obtain state data for application-A 218 and application-B 222 to determine, for example, whether application-A 218 and application-B 222 are executing in the foreground or background, where application-rendered content for each application is being displayed or viewed, and so forth.

In this example, application-A rendered content 224 is displayed or output to display 208 of core computing device 202, while application-B rendered content 228 is displayed or output to display 226 of auxiliary device 204. Display 208 may be an illustrative example of content output destination 112 in FIG. 1, and display 226 may be an illustrative example of content output destination 116 in FIG. 1. Audio routing component 206 may identify audio endpoint(s) 210 corresponding to display 208 where application-A rendered content 224 is being displayed, and route audio signal A 216 to audio endpoint(s) 210. Audio routing component 206 may identify audio endpoint(s) 230 corresponding to display 226 where application-B rendered content 228 is being displayed, and route audio signal B 220 to audio endpoint(s) 230. In this way, audio routing component 206 provides smart audio routing based on the viewing location of application-rendered content.

In another example, application-C 232 may have multiple views, with application-rendered content displayed over core computing device 202 and auxiliary device 204. In this illustrative example, application-C rendered content 234 may be one view that is displayed over display 226 of auxiliary device 204, and application-C rendered content 236 may be another view that is displayed over display 208 of core computing device 202. Audio routing component 206 may receive audio signal C 238 associated with application-C 232, and use application state data obtained for application-C 232 to intelligently route audio signal C 238 to an appropriate audio endpoint.

In one illustrative example, audio signal C 238 may correspond to content of a specific view, such as application-C rendered content 234 being viewed over display 226. In this example, audio routing component 206 may route audio signal C 238 to audio endpoint(s) 230 as the associated audio endpoint of auxiliary device 204 where the corresponding content is being viewed.

As another example, application-C 232 may be an illustrative example of a presentation application that provides multiple views, such as slides for a presentation in one view with notes for the presenter in another view. In this example, application-C rendered content 234 may be the slide view displayed on auxiliary device 204 to an audience, and application-C rendered content 236 may be the notes view displayed on the presenter's computing device for use during a presentation. Audio signal C 238 may be audio content that corresponds to an embedded video in one of the slides presented, for example. Audio routing component 206 may route audio signal C 238 to audio endpoint(s) 230 in this example, because that is the appropriate audio endpoint for where the application view corresponding to the audio content is being displayed.

In another illustrative example, audio signal A 216 may be audio content that corresponds to an incoming call notification of a telephone application, with application-A 218 as the telephone application. In this exemplary scenario, audio routing component 206 may identify that application-C 232 is in the foreground with multiple views displayed over both connected devices, such as the presentation scenario illustrated above, while application-A 218 is in the background. Audio routing component 206 may route the incoming call notification to an internal speaker of the core computing device, for example, based in part on the state data of each application and in part on a policy, such as policy 126 in FIG. 1. For example, the policy may include heuristics for determining where to route audio signals based on application state data.

Figure 3:
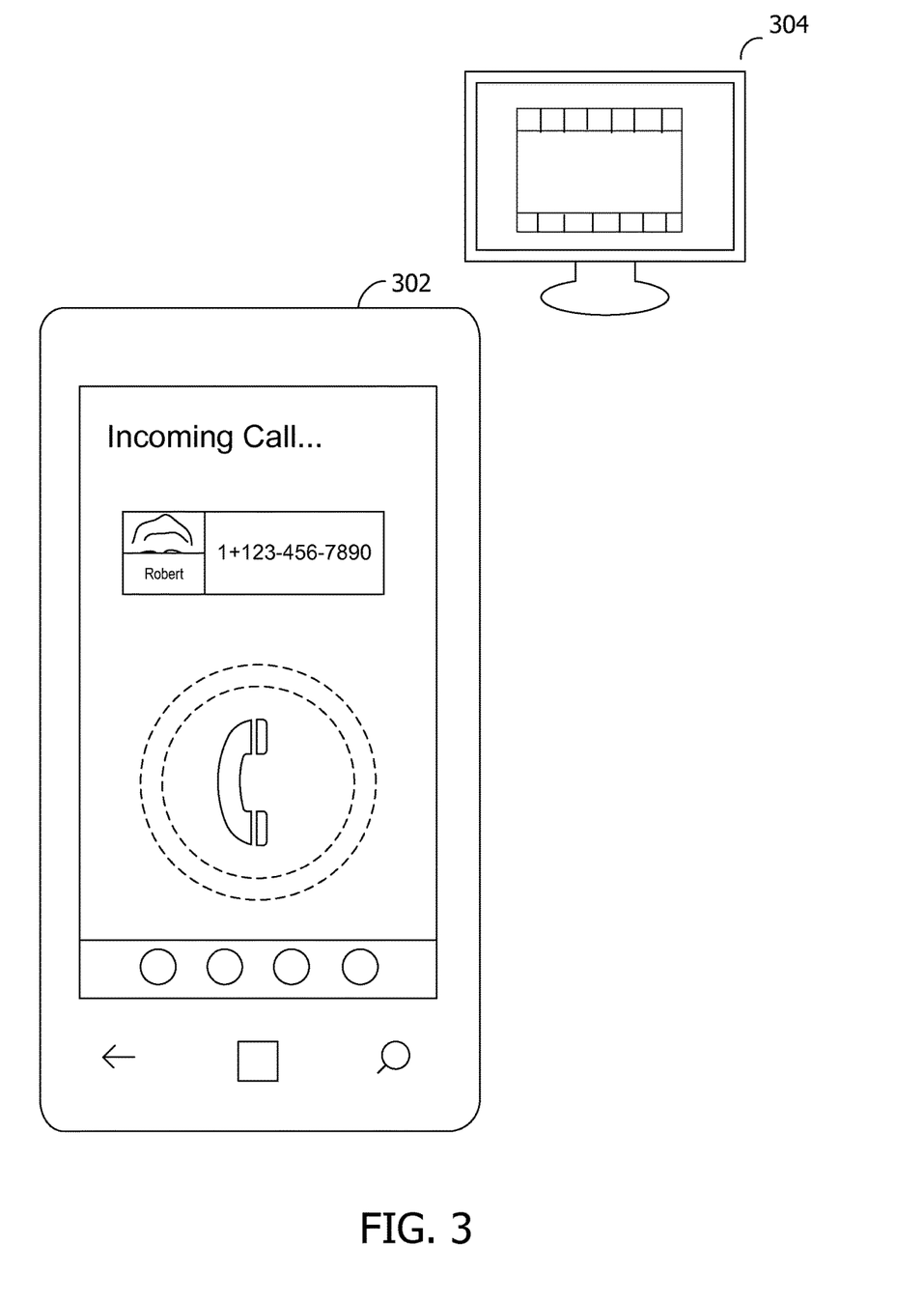
FIG. 3 is an exemplary block diagram illustrating a mobile device and an auxiliary device in disjoint mode.

Referring next to FIG. 3, an exemplary block diagram illustrates a mobile device and an auxiliary device in disjoint mode. Mobile device 302 may be an illustrative example of any type of mobile device, such as a smart phone or tablet, for example. Auxiliary computing device 304 may be an illustrative example of a second screen, such as a monitor, television, or other display device, for example.

Mobile device 302 may be communicatively coupled to or in communication with auxiliary device 304. Mobile device 302 may provide media application rendered content, such as a streaming cinematic movie for example, for output at auxiliary device 304. While streaming a movie over auxiliary device 304, mobile device 302 may receive an incoming call, displaying a communications application on a display screen of mobile device 302. An audio routing component, such as audio routing component 118 in FIG. 1 for example, may route the movie audio to an audio endpoint associated with auxiliary device 304, such as a television speaker, while routing the incoming call audio to an audio endpoint associated with mobile device 302, such as an internal speaker or earpiece connected to mobile device 302, for example.

Any number of possible connectivity configurations between devices and routing configurations of multiple audio signals associated with multiple applications may be implemented using the audio routing component. The illustrative examples provided herein are not intended to limit in any way the configuration options or routing options provided by the intelligent audio routing management described herein.

Figure 4:
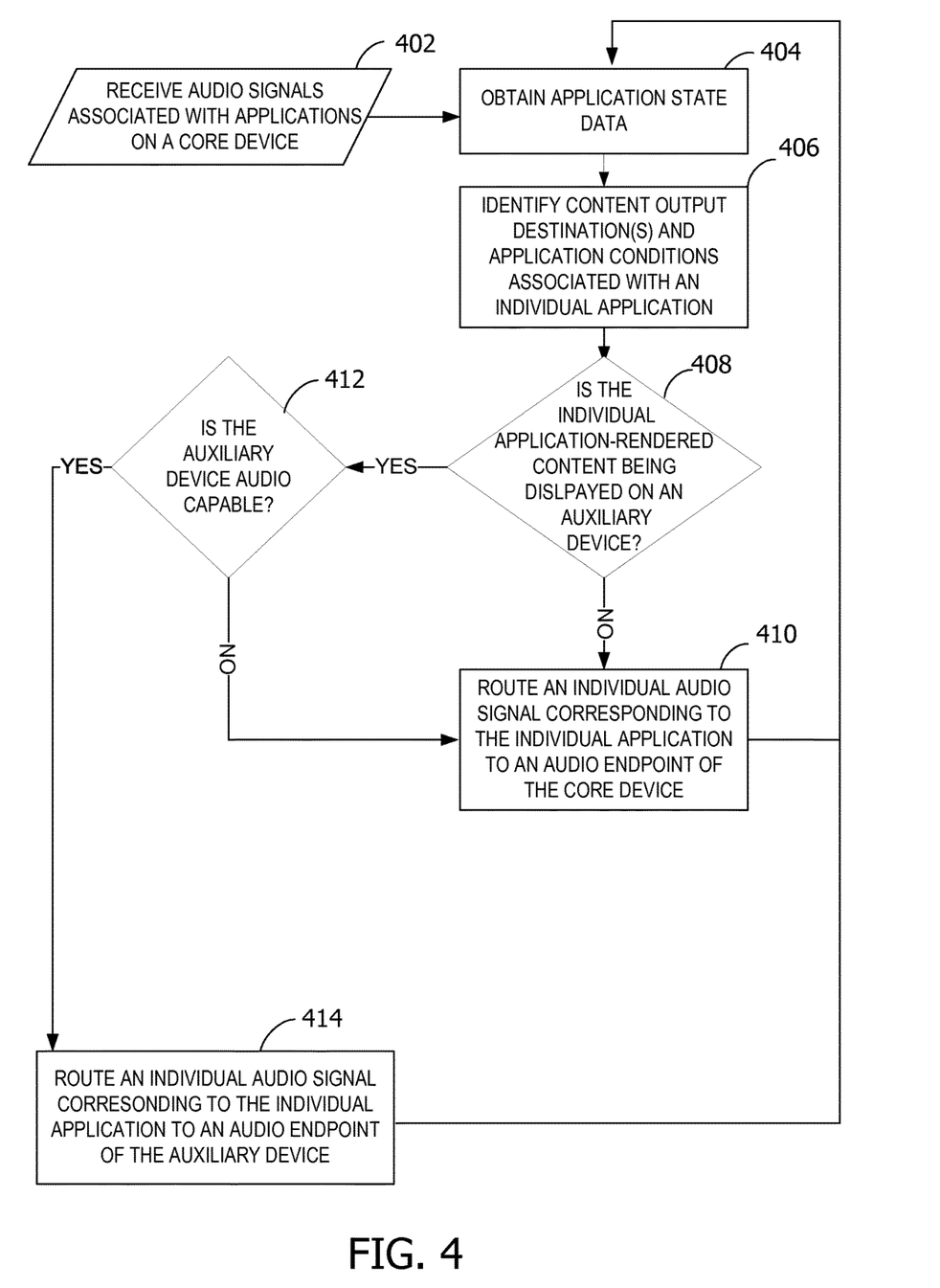
FIG. 4 is an exemplary flowchart illustrating operations performed by an audio routing component implemented on a computing device.

Referring next to FIG. 4, an exemplary flowchart illustrates operations performed by an audio routing component implemented on a computing device. These operations may be performed by an audio routing component, such as audio routing component 118 of FIG. 1 or audio routing component 206 of FIG. 2, for example.

The process begins by receiving audio signals associated with applications on a core device at operation 402. The process obtains application state data at operation 404. The application state data may be identified by the audio routing component, or obtained by the audio routing component, for example. State data may include information about individual applications, such as whether an application is executing in the foreground or background, whether an individual application is active or non-active, whether an individual application has one view or multiple views, whether an individual application with multiple views is being displayed or viewed on one device or over multiple devices, whether an individual application is in full-screen mode or partial-screen mode, whether an individual application is operating in a shared mode or an exclusive mode, or any other suitable state data associated with applications capable of being executed by a computing device, for example.

The process identifies content output destination(s) and corresponding application conditions associated with an individual application at operation 406. The content output destination may be, for example, a local display of the core device, an auxiliary display device in communication with the core device, or both the local display and the auxiliary display. For example, a user interface component of the core device may provide application-rendered content for an individual application having a plurality of views to both a core device display and an auxiliary device display. In other examples, a user interface component may provide application-rendered content to one content output destination. The application conditions may be determined based on the obtained application state data. For example, the application condition may indicate that the individual application is displayed in a full-screen mode and an exclusive mode on a specific device display location.

The process determines whether the individual application-rendered content is being displayed on an auxiliary device at operation 408, based on the identified content output destination(s) at operation 406. Responsive to a determination that the individual application-rendered content is not being displayed on an auxiliary device, the process routes an individual audio signal corresponding to the individual application to an audio endpoint of the core device at operation 410, the audio endpoint determined by one or more policies and based on the identified application conditions associated with the individual application. The process may return to operation 404 to process additional audio signals, if applicable.

Responsive to a determination that the individual application-rendered content is being displayed on an auxiliary device, the process determines whether the auxiliary device is audio capable at operation 412. This determination may be based in part on auxiliary device data obtained during the connection established by the core device with the auxiliary device, for example. If the process determines that the auxiliary device is not audio capable, the process proceeds to operation 410, routing an individual audio signal corresponding to the individual application to an audio endpoint of the core device. If the process determines that the auxiliary device is audio capable at operation 412, the process routes an individual audio signal corresponding to the individual application to an audio endpoint of the auxiliary device at operation 414, and may return to operation 404 to process additional audio signals, if applicable.

Figure 5:
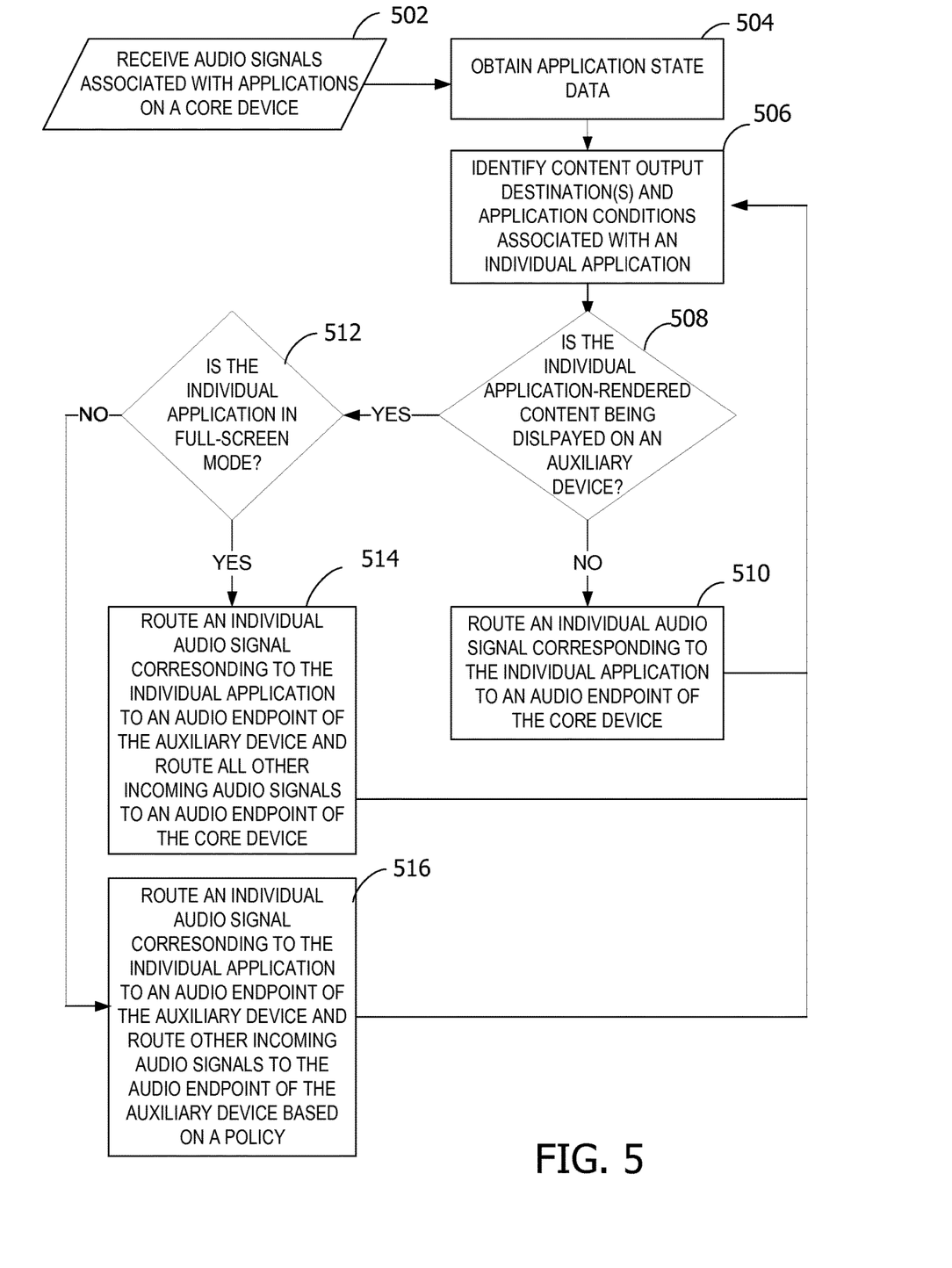
FIG. 5 is an exemplary flowchart illustrating operations performed by a core computing device implementing the audio routing component.

Referring next to FIG. 5, an exemplary flowchart illustrates exemplary operations performed by an audio routing component implemented on a computing device when an application is in a full-screen mode on a connected device. These operations may be performed by an audio routing component, such as audio routing component 118 of FIG. 1 or audio routing component 206 of FIG. 2, for example. In some examples, these operations are performed in association with or concurrently with the operations illustrated in FIG. 4.

The process begins by receiving audio signals associated with applications on a core device at operation 502. The process obtains application state data for the applications executed by the core device at operation 504. The process identifies content output destination(s) and application conditions associated with an individual application at operation 506. The process determines whether the individual application-rendered content is being displayed on an auxiliary device at operation 508.

Responsive to a determination that the individual application-rendered content is not being displayed on an auxiliary device, the process routes an individual audio signal corresponding to the individual application to an audio endpoint of the core device at operation 510, and may return to operation 506 to process additional audio signals associated with other applications.

Responsive to a determination that the individual application-rendered content is being displayed on an auxiliary device, the process determines whether the individual application is in full-screen mode at operation 512. Responsive to a determination that the individual application is in full-screen mode on the auxiliary device, the process routes an individual audio signal corresponding to the individual application to an audio endpoint of the auxiliary device and routes all other incoming audio signals associated with other applications to an audio endpoint of the core device at operation 514.

Responsive to a determination that the individual application is not in full-screen mode on the auxiliary device, the process routes an individual audio signal corresponding to the individual application to an audio endpoint of the auxiliary device and routes other incoming audio signals associated with other applications to the audio endpoint of the auxiliary device based on a policy at operation 516.

For example, if a media application displayed on the auxiliary device is not in full-screen mode, an incoming telephone call notification sound may be routed to the auxiliary device audio endpoint, based in part on the partial-screen mode of the media application and based in part on user interaction detected with the media application rendered on the auxiliary device, as one illustrative example. In another example, if the media application displayed on the auxiliary device is in full-screen mode, an incoming telephone call notification may be routed to the core device internal speaker based in part on a policy.

The exemplary process illustrated in FIG. 5 provides one possible example decision route based on application state data and application conditions. Any number of routing decisions may occur using the audio routing component described herein. The exemplary operations illustrated in FIG. 4 and FIG. 5 do not limit the scope or describe the entirety of possible decisions the smart audio routing component may process. These illustrative examples are presented to describe some possible implementations without limiting in any way the operations of the audio routing component. For example, the process in FIG. 5 may make additional determinations as to other application conditions or available audio endpoints, or user-specified parameters corresponding to specific applications, that adjust the decision process depicted in FIG. 5.

Figure 6A:
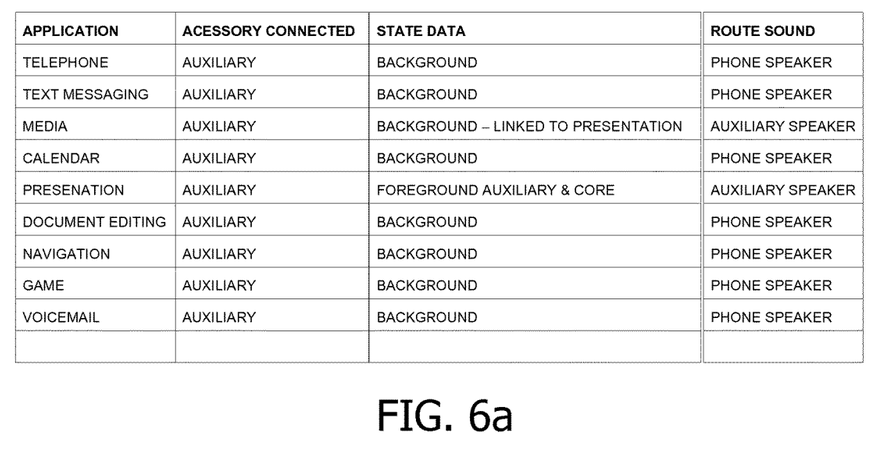
FIG. 6*a* and FIG. 6*b* are exemplary tables illustrating heuristics used for smart audio routing management.
Figure 6B:
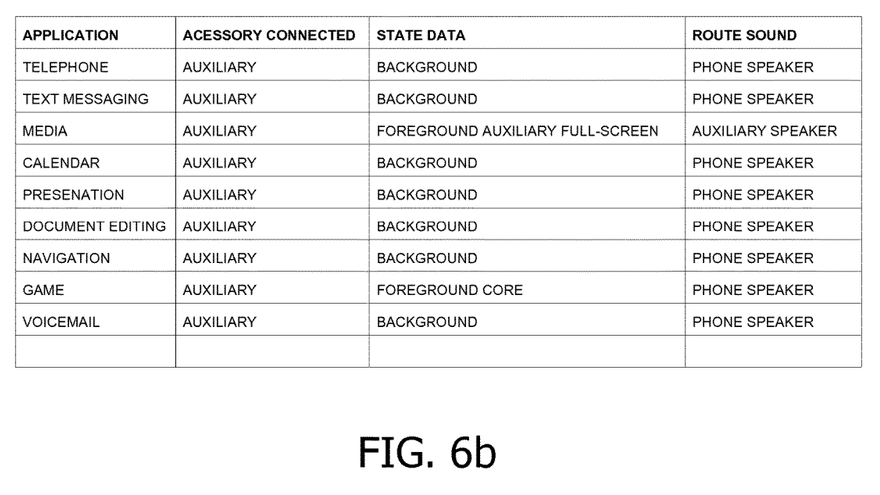

FIG. 6a and FIG. 6b are exemplary tables illustrating heuristics used for smart audio routing management. Audio routing component 118 in FIG. 1, for example, may use these exemplary tables in determining where to route a received audio signal. These illustrative tables may be examples of some of the heuristics of policy 126 in FIG. 1, for example.

In the example of FIG. 6a, the state data obtained for the applications implemented on a core device (e.g. a mobile phone) that is in communication with or connected to an auxiliary device (e.g. a second screen) may indicate that a presentation application is executing in the foreground and is being displayed on both the auxiliary and the core device. A media application may be executing in the background, with the selection of an embedded link of a presentation slide bringing the media application to the foreground when triggered, in one example. This table illustrates one possible scenario where the audio routing component may route sound for the presentation to the auxiliary speaker, and sound from the media application for the embedded link to the auxiliary speaker. Other audio signals received for applications running in the background may be routed to the phone speaker when received based in part on the state data indicating the presentation application is in the foreground and is being viewed on both devices, for example.

In the example of FIG. 6b, the state data obtained may indicate that a media application is executing in the foreground and that media application-rendered content is being displayed at the auxiliary device in a full-screen mode. In this illustrative scenario, the audio routing component may route audio content associated with the movie playing on the second screen to an auxiliary speaker associated with the second screen. In this same example, a gaming application may be executing in the foreground and may be displayed on the mobile phone display. The audio routing component may route game sounds to the phone speaker as movie sounds are routed to the second screen speaker, in these examples.

ADDITIONAL EXAMPLES

In some example scenarios, the process described herein may have multiple views based on where a view is rendered, and the audio routing component may route audio associated with a particular view to an audio endpoint associated with the viewing location for that particular view. For example, in one exemplary scenario a power point presentation may be presented with two views, a first view providing presenter notes on a mobile device for presenter viewing and a second view providing presentation slides with embedded video on a big screen for audience viewing. In this example, when the presentation reaches an embedded video on a slide, the audio routing component will identify that the viewing location for that video is the big screen, identify an audio endpoint associated with the big screen, and route the audio for that embedded video to the identified audio endpoint for the big screen. In the same example, if a text message notification is received by the audio routing component during the presentation, the notification may be routed to an audio endpoint associated with the mobile device, which may also be where a visual notification of the text message is displayed as well. The smart audio routing management provides for a better user experience and smarter audio routing, automatically determining where audio should be routed without requiring user-directed management in the moment.

In some other examples, if a media application implemented on a user device is running in the foreground and streaming a movie on a second screen in full-screen mode while a gaming application is also running in the foreground and being displayed on the user device display, the audio routing component may route the movie audio signals to an audio endpoint associated with the second screen while routing the game audio signals to an audio endpoint associated with the user device, for example. Each separate application may have associated audio signals that are routed to an appropriate endpoint associated with where an individual application is being viewed, in these examples.

Alternatively or in addition to the other examples described herein, examples include any combination of the following:

the content output destination comprises at least one of a display location or an audio output location;
determine a content output destination associated with another application;
identify an audio endpoint corresponding to the content output destination associated with the other application;
route another audio signal associated with the other application to the identified audio endpoint corresponding to the content output destination associated with the other application;
a user interface component implemented on the primary device and configured to stream a user interface of the computing device to a display of the auxiliary device;
receive another audio signal associated with another application implemented on the mobile device;
obtain state date for the other application;
determine another viewing location associated with the other application;
identify an audio endpoint associated with the determined other viewing location for the other application;
route the other audio signal to the identified audio endpoint for the other application;
the audio routing component receives the audio signal and the other audio signal concurrently;
the audio routing component receives a plurality of audio signals associated with a plurality of applications implemented on the mobile device and routes the plurality of audio signals to individual audio endpoints based on viewing locations associated with application-rendered content for the plurality of applications;
stream a user interface of the mobile device to a display of the auxiliary device;
receive a plurality of audio signals associated with a plurality of applications;
determine which audio endpoints to route the plurality of audio signals to based on a policy;
identify an audio signal from the plurality of audio signals that is associated with an individual application having a current viewing location corresponding to a display of the auxiliary device;
route the identified audio signal to an audio endpoint associated with the auxiliary device;
route the remaining audio signals from the plurality of audio signals to the mobile device based at least in part on state data obtained for the individual application;
responsive to a determination that the auxiliary device is not audio capable, routing the audio signal to an audio endpoint of the core device;
receiving another audio signal associated with another application executed by the core device;
determining whether application-rendered content for the application associated with the viewing location corresponding to the auxiliary device is in full-screen mode;
responsive to a determination that the application-rendered content for the application is in full-screen mode, routing the other audio signal associated with the other application to an audio endpoint of the core device;
responsive to a determination that the application-rendered content for the application is not in the full-screen mode, routing the other audio signal associated with the other application to the identified audio endpoint of the auxiliary device;
establishing, by the core device, a connection with the auxiliary device;
streaming a user interface of the core device to a display of the auxiliary device;

receiving a plurality of audio signals associated with a plurality of applications;

determining which audio endpoints to route the plurality of audio signals to based on a policy;

the state data obtained for the application comprises at least one of a foreground active state, a foreground non-active state, or a background state;

receiving an audio signal associated with an application having application-rendered content comprising a plurality of views, at least part of the application-rendered content projected on a display associated with the core device and at least another part of the application-rendered content projected on a display associated with the auxiliary device, and the received audio signal corresponding to a portion of the application-rendered content;

identifying a viewing location associated with the portion of the application-rendered content;

routing the audio signal to an audio endpoint associated with the identified viewing location for the portion of the application-rendered content;

receiving a next audio signal associated with a next application, the next application having a background state;

routing the next audio signal to an audio endpoint associated with the core device.

At least a portion of the functionality of the various elements in FIG. 1 may be performed by other elements in FIG. 1, or an entity (e.g., processor, web service, server, application program, computing device, etc.) not shown in FIG. 1.

In some examples, the operations illustrated in FIG. 4-5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to application data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Figure 7:
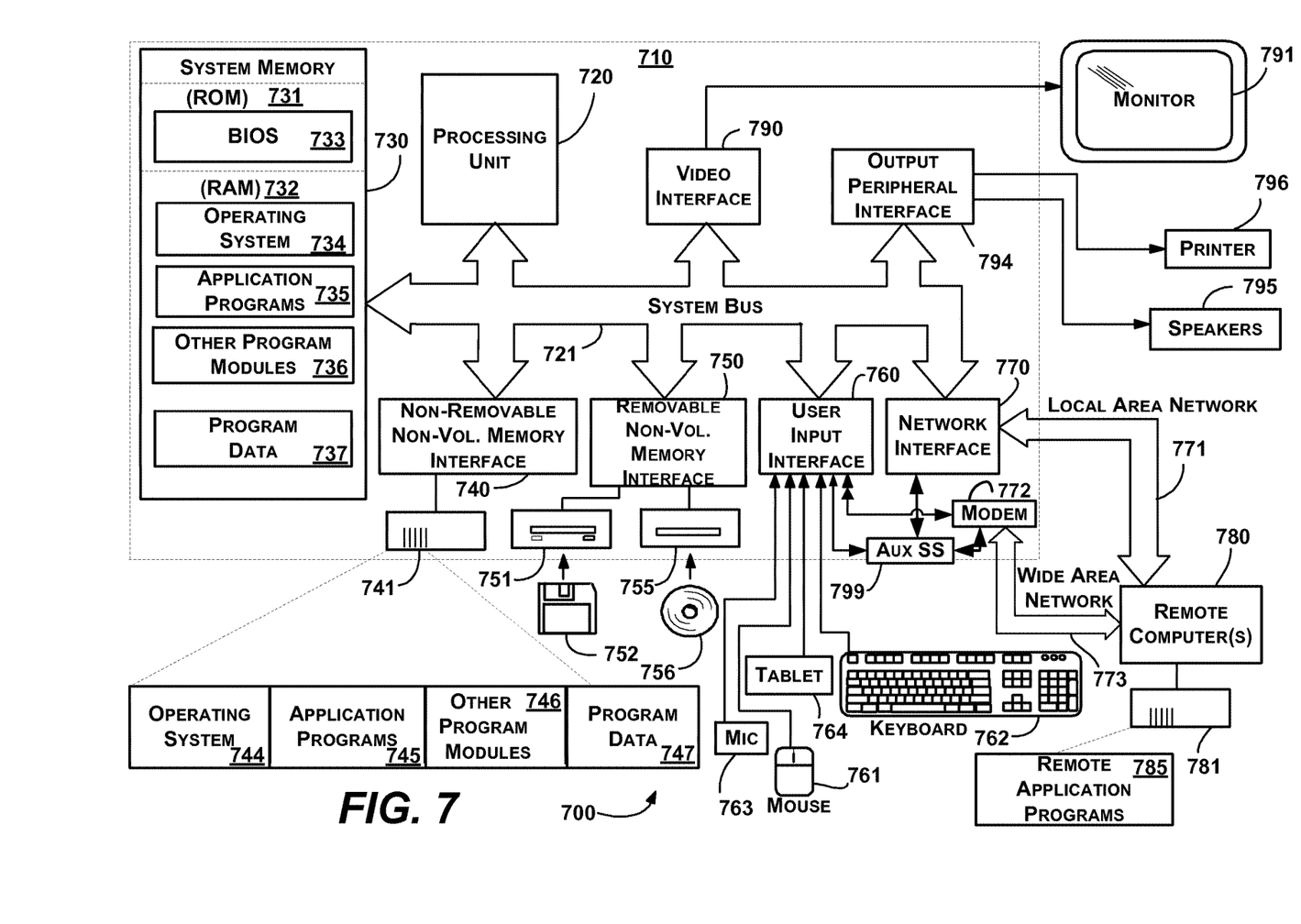
FIG. 7 is an exemplary block diagram illustrating an operating environment for a computing device implementing an audio routing component.

FIG. 7 illustrates an example of a suitable computing and networking environment 700 on which the examples of FIGS. 1-3 may be implemented. The computing system environment 700 is only one example of a suitable computing environment and is not intended to suggest any limitation as to the scope of use or functionality of the disclosure. Neither should the computing environment 700 be interpreted as having any dependency or requirement relating to any one or combination of components illustrated in the exemplary operating environment 700.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the disclosure may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Memory 731 and 732 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the computer 710. Computer storage media does not, however, include propagated signals. Rather, compute storage media excludes propagated signals. Any such computer storage media may be part of computer 710.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components may either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel may be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

The examples illustrated and described herein as well as examples not specifically described herein but within the scope of aspects of the disclosure constitute exemplary means for crafting a response based on targeted sentiment identification. For example, the elements illustrated in FIG. 1-3, such as when encoded to perform the operations illustrated in FIG. 4-5, constitute exemplary means for determining state data for applications, exemplary means for determining content output locations associated with the applications, and exemplary means for routing received audio signals associated with the applications to appropriate audio endpoints associated with the content output locations in order to facilitate smart audio routing management.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for audio routing comprising:
   a computing device configured to stream content to another device;
   an audio routing component coupled to the computing device and configured to:
      receive a plurality of audio signals associated with a plurality of applications implemented on the computing device;
      obtain application state data for the plurality of applications;
      determine a content output destination for each application of the plurality of applications based at least in part on the obtained application state data, the content output destination corresponding to at least one of the computing device or the other device;
      identify an audio endpoint associated with the determined content output destination for each application; and
      route a first audio signal associated with a first application of the plurality of applications to a first corresponding identified audio endpoint and route a second audio signal associated with a second application of the plurality of applications to a second corresponding identified audio endpoint, wherein the first audio signal and the second audio signal are from the received plurality of audio signals.

2. The system of claim 1, wherein the content output destination comprises at least one of a display location or an audio output location.

3. The system of claim 1, wherein the audio routing component is further configured to:
   determine a content output destination associated with another application;
   identify an audio endpoint corresponding to the content output destination associated with the other application; and
   route another audio signal associated with the other application to the identified audio endpoint corresponding to the content output destination associated with the other application.

4. The system of claim 1 further comprising:
   a user interface component implemented on the computing device and configured to stream a user interface of the computing device to a display of the other device.

5. A mobile device for audio routing comprising:
   a user interface component configured to project application-rendered content to another device; and
   an audio routing component configured to:
      receive a first audio signal associated with a first application and a second audio signal associated with a second application implemented on the mobile device;
      obtain application state data for each of the first application and the second application;
      determine a viewing location associated with application-rendered content of the first application and another viewing location associated with application-rendered content of the second application, the viewing location and the other viewing location each corresponding to a display associated with at least one of the mobile device or the other device;
      identify an audio endpoint associated with the determined viewing location for the first application and another audio endpoint associated with the determined viewing location for the second application; and
      route the first audio signal to the identified audio endpoint associated with the determined viewing location for the first application and route the second audio signal to the other identified audio endpoint associated with the other determined viewing location for the second application.

6. The mobile device of claim 5, wherein the audio routing component is further configured to:
   receive another audio signal associated with another application implemented on the mobile device;
   obtain state date for the other application;
   determine another viewing location associated with the other application;
   identify an audio endpoint associated with the determined other viewing location for the other application; and
   route the other audio signal to the identified audio endpoint for the other application.

7. The mobile device of claim 6, wherein the audio routing component receives a plurality of audio signals concurrently.

8. The mobile device of claim 5, wherein the audio routing component receives a plurality of audio signals associated with a plurality of applications implemented on the mobile device and routes the plurality of audio signals to individual audio endpoints based on viewing locations associated with application-rendered content for the plurality of applications.

9. The mobile device of claim 5, wherein the mobile device is further configured to establish a connection with the other device, and wherein the user interface component is further configured to:
   stream a user interface of the mobile device to a display of the other device.

10. The mobile device of claim 5, wherein the audio routing component is further configured to:
    receive a plurality of audio signals associated with a plurality of applications; and determine which audio endpoints to route the plurality of audio signals to based on a policy.

11. The mobile device of claim 10, wherein the audio routing component determines the audio endpoints to route the plurality of audio signals to based on a policy, including to:
identify an audio signal from the plurality of audio signals that is associated with an individual application having a current viewing location corresponding to a display of the other device;
route the identified audio signal to an audio endpoint associated with the other device; and
route the remaining audio signals from the plurality of audio signals to the mobile device based at least in part on state data obtained for the individual application.

12. A method for audio routing comprising:
receiving, by an audio routing component, at least two audio signals associated with at least two applications executed by a first device;
obtaining application state data for the at least two applications;
identifying individual viewing locations associated with the at least two applications, at least one individual viewing location corresponding to a second device;
determining whether the second device is audio capable;
responsive to a determination that the second device is audio capable, identifying an audio endpoint associated with the second device; and
routing an audio signal to the identified audio endpoint of the second device based at least in part on the obtained application state data.

13. The method of claim 12 further comprising:
responsive to a determination that the second device is not audio capable, routing the audio signal to an audio endpoint of the first device.

14. The method of claim 12 further comprising:
receiving another audio signal associated with another application executed by the first device;
determining whether application-rendered content for the application associated with the viewing location corresponding to the second device is in full-screen mode;
responsive to a determination that the application-rendered content for the application is in full-screen mode, routing the other audio signal associated with the other application to an audio endpoint of the first device.

15. The method of claim 14 further comprising:
responsive to a determination that the application-rendered content for the application is not in the full-screen mode, routing the other audio signal associated with the other application to the identified audio endpoint of the second device.

16. The method of claim 12 further comprising:
establishing, by the first device, a connection with the second device; and
streaming a user interface of the first device to a display of the second device.

17. The method of claim 12 further comprising:
receiving a plurality of audio signals associated with a plurality of applications; and
determining which audio endpoints to route the plurality of audio signals to based on a policy.

18. The method of claim 12 wherein the state data obtained for the application comprises at least one of a foreground active state, a foreground non-active state, or a background state.

19. The method of claim 12 further comprising:
receiving an audio signal associated with an application having application-rendered content comprising a plurality of views, at least part of the application-rendered content projected on a display associated with the first device and at least another part of the application-rendered content projected on a display associated with the second device, and the received audio signal corresponding to a portion of the application-rendered content;
identifying a viewing location associated with the portion of the application-rendered content; and
routing the audio signal to an audio endpoint associated with the identified viewing location for the portion of the application-rendered content.

20. The method of claim 19 further comprising:
receiving a next audio signal associated with a next application, the next application having a background state; and
routing the next audio signal to an audio endpoint associated with the first device.

* * * * *